(12) United States Patent
Shrivastava et al.

(10) Patent No.: US 7,853,079 B1
(45) Date of Patent: Dec. 14, 2010

(54) TECHNIQUE FOR AUTOMATIC POSTER FRAME DETECTION

(75) Inventors: Swapnil Shrivastava, Bhopal (IN); Alok Kumar Singh, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1040 days.

(21) Appl. No.: 11/636,000

(22) Filed: Dec. 8, 2006

(51) Int. Cl.
*G06K 9/00* (2006.01)
(52) U.S. Cl. .................. 382/173; 348/333.05; 715/838
(58) Field of Classification Search .............. None
See application file for complete search history.

(56) References Cited

U.S. PATENT DOCUMENTS

2007/0256091 A1* 11/2007 Horiguchi ............ 725/22
2008/0107343 A1* 5/2008 Sanford ............ 382/199
2009/0297115 A1* 12/2009 Covell et al. ............ 386/46

* cited by examiner

*Primary Examiner*—Brian P Werner (57) ABSTRACT

A technique that may be used to configure a computer system to automatically search a video and select a frame within the video clip that best represents the content of that video. A frame contained in a video is identified. Luminance values for each pixel in a plurality of pixels contained in the frame are then generated. The frame is then selected as a poster frame for the video if a luminance value for at least one pixel in the plurality of pixels contained in the identified frame is outside a range of luminance values. The range of luminance values may be determined from a luminance value associated with a reference pixel contained in the frame.

22 Claims, 11 Drawing Sheets

TECHNIQUE FOR AUTOMATIC POSTER FRAME DETECTION

BACKGROUND

Conventional computerized devices, such as personal computers, laptop computers and the like, are often used to package video content (videos) into various forms (e.g., Digital Video Discs (DVDs)), that may be later played by a user. Often authoring tools are used to package the videos. An authoring tool is a software package which may be used by developers to package content deliverable to end users. This content may include a series of videos that are packaged by a developer on a DVD that may ultimately be played by an end user using a DVD reader. Here, the authoring tool may allow the developer to create the DVD by dragging and dropping various graphical objects that represent video clips into a DVD project. The authoring tool may then burn the video clips contained in the project onto a DVD disc to produce the DVD.

Videos typically comprise a series of smaller units called video frames (frames). A frame is a still image of the subject matter of the video. The images may be taken by a motion picture camera or may be produced using various software, such as animation software. Motion picture cameras typically capture a fixed number of digitized images of the subject matter each second. The digitized images are then processed into frames and placed in a video file. Video files that conform to the Moving Pictures Experts Group (MPEG) standard typically contain 25 frames per second of video.

For each video clip in a DVD project, a developer creating a DVD project may select a single video frame that is representative of the content of the video clip as a "poster image" (also referred to as a "poster frame"). A poster frame is a video frame contained in a video that is used to represent the content of the video. In a typical arrangement, the developer may manually review the frames within a video clip and visually identify a frame that best represents the video clip. The developer may then specify the identified frame as the poster image poster that best represents the content of the video clip.

SUMMARY

Conventional technologies related to selecting a poster frame from a video clip often suffer from a variety of deficiencies. In particular, conventional technologies related to automatically selecting a poster frame from a video clip typically select the first frame in the video clip as the poster frame. The first frame may be an empty frame, a blurry frame or a frame that simply does not properly reflect the content of the video clip. Other manual conventional technologies, such as the technologies described above, may rely on a user (developer) to determine the poster frame via the naked human eye. Here, the user may review each frame within the video clip to understand the content of the video clip and then select the poster frame. This process may be arduous and very time consuming especially for clips that contain many thousands of frames.

The techniques disclosed herein significantly overcome such deficiencies by providing a technique that may be used to configure a computer system to automatically search a video and select a frame within the video clip that best represents the content of that video. In accordance with an aspect of the techniques described herein, a frame contained in a video is identified and luminance values for each pixel in a plurality of pixels contained in the frame are then generated. The frame is then selected as a poster frame for the video if a luminance value for at least one pixel in the plurality of pixels contained in the identified frame is outside a predetermined range of luminance values. The predetermined the range of luminance values may be determined from a luminance value associated with a reference pixel contained in the frame.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
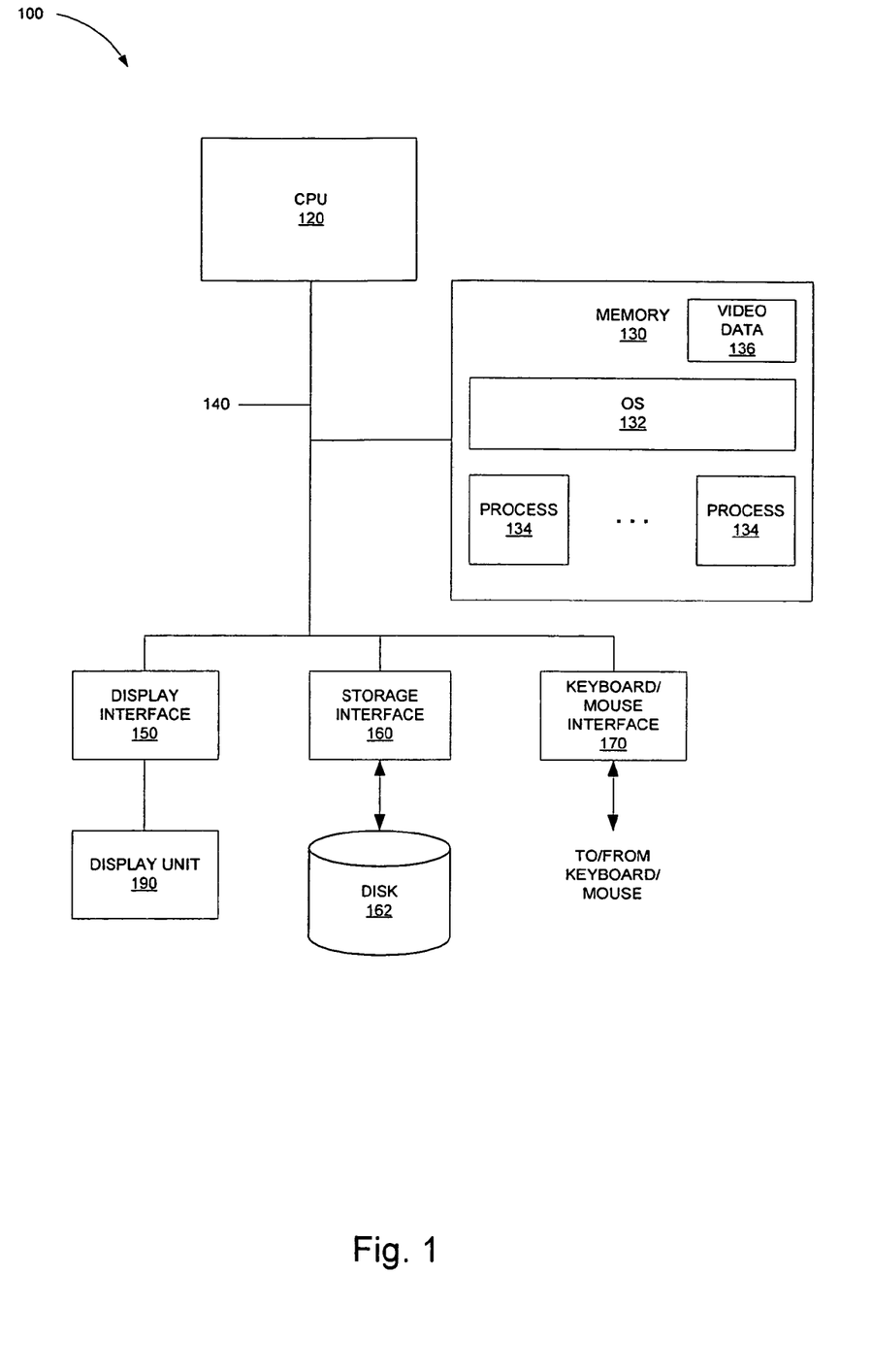
FIG. 1 is a high-level block diagram of an example of a computer system that may be used with the techniques described herein.

FIG. 1 is a high-level block diagram of an example of a computer system 100 that may be used with the techniques described herein. Referring to FIG. 1, system 100 comprises a central processing unit (CPU) 120 coupled to a memory 130 and various interfaces via a local bus 140. The interfaces include a display interface 150, a storage interface 160 and a keyboard/mouse interface 170. It should be noted that computer system 100 is one example of a computer system that may be used with the techniques described herein. Other computer systems, including computer systems far more complex than system 100, may be adapted to take advantage of the techniques described herein. An example of a computer system that may be used with the techniques described herein is an International Business Machines (IBM) compatible Personal Computer (PC), such as a Dimension series computer system available from Dell Incorporated, Round Rock, Tex.

The CPU 120 is a conventional processor that comprises processing circuitry for executing instructions and manipulating data contained in the memory 130 including instructions and data that implement aspects of the techniques described herein. The local bus 140 is a point-to-point interconnect bus configured to couple various entities contained in system 100 including the processor 120, the memory 130 and interfaces 150, 160 and 170, and enable data and signals to be transferred between these entities.

The display interface 150 is a conventional display interface (e.g., a graphics card) that comprises circuitry configured to enable the processor 120 to display information on the display unit 190, such as frames associated with videos. Display unit 190 is a conventional display unit, such as a Cathode Ray Tube (CRT) or a Liquid Crystal Display (LCD) display. The keyboard/mouse interface 170 comprises circuitry configured to interface a conventional keyboard device (not shown) and mouse device (not shown) to the system 100 and enable data and signals to be transferred between these devices and the system 100.

The storage interface 160 is a conventional storage device interface comprising circuitry configured to interface storage devices, such as disk unit 162, to the bus 140 and enable data and signals to be transferred between the storage devices and entities on bus 140. Disk unit 162 is a conventional disk unit configured as a data storage that stores information used by system 100, such as video data contained in video data files.

Memory 130 is a computer-readable medium implemented as a conventional random access memory (RAM) data storage comprising various RAM devices, such as dynamic RAM (DRAM) devices. Memory 130 is configured to hold various software and data including operating system (OS) 132, one or more processes (134) and video data 136. The OS 132 is a conventional operating system comprising computer-executable instructions and data that implement various operating system functions, such as scheduling processes 134 for execution on the processor 120 and managing various entities (e.g., memory 130) contained in the system 100. The processes 134 are software processes that execute under control of the OS 132. These processes contain computer-executable instructions and data that may include computer-executable instructions and data that implement aspects of the techniques herein. Video data 136 comprises information associated with a video (e.g., frames) that may be stored in a video data file (not shown) contained on disk 162. The information may include data associated with frames contained in the video.

It should be noted that functions performed by the system 100, including functions that implement aspects of the techniques described herein, may be implemented in whole or in part using some combination of hardware and/or software. It should be further noted that computer-executable instructions and/or computer data that implement aspects of the techniques described herein may be stored in various computer-readable mediums, such as volatile memories, non-volatile memories, flash memories, removable disks, non-removable disks and the like. In addition, it should be noted that various electromagnetic signals, such as wireless signals, electrical signals carried over a wire, optical signals carried over optical fiber and the like, may be encoded to carry computer-executable instructions and/or data that implement aspects of the techniques described herein, e.g., in a communication network.

Videos processed by the techniques described herein contain one or more frames. Each frame comprises a plurality of pixels which are small discrete elements that together constitute an image contained in the frame. The frames are organized in a chronological sequence in the video. The number of frames contained in a second's worth of video may vary depending on the technique used to code the video. For example, the commonly used Moving Picture Experts Group (MPEG) MPEG-2 standard contains provisions for coding one second of video as a sequence of 25 frames.

Figure 2:
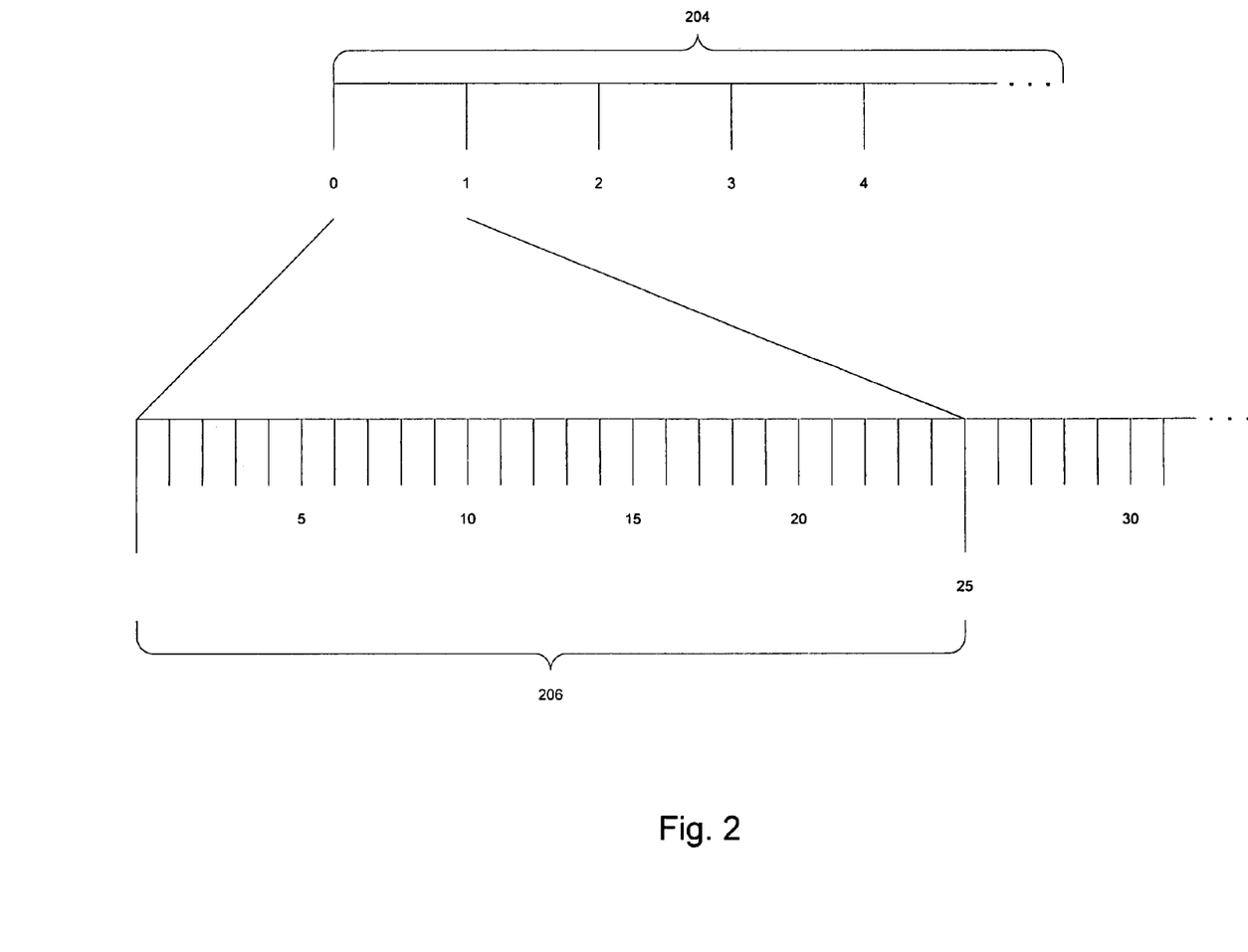
FIG. 2 illustrates an example of a timeline of a video comprising a plurality of one second time intervals wherein each time interval contains a plurality of frames.

FIG. 2 illustrates an example of a timeline 204 of a video that may be used with the techniques described herein. Timeline 204 comprises a plurality of time intervals wherein each time interval contains a plurality of video frames 206. The time intervals are one second intervals starting at "zero seconds" which corresponds to the beginning of the video. Each time interval illustratively contains 25 frames. Thus, the first 25 frames of the video 206 are contained in the first time interval which spans from zero seconds to one second into the video, the next 25 frames are contained in the second time interval which spans from 1 second to 2 seconds into the video and so on. As will be described further below, aspects of the techniques described herein divide a video into a series of time intervals, such as the time intervals illustrated in FIG. 2, and analyze frames contained within the time intervals to identify a poster frame for the video.

It should be understood that the above-described timeline is an example of a timeline of a video that employs a 25 frames-per-second video format. It should be noted that other video formats (e.g., a video format that contains 24 frames per second) may be used with the techniques described herein.

Figure 3:
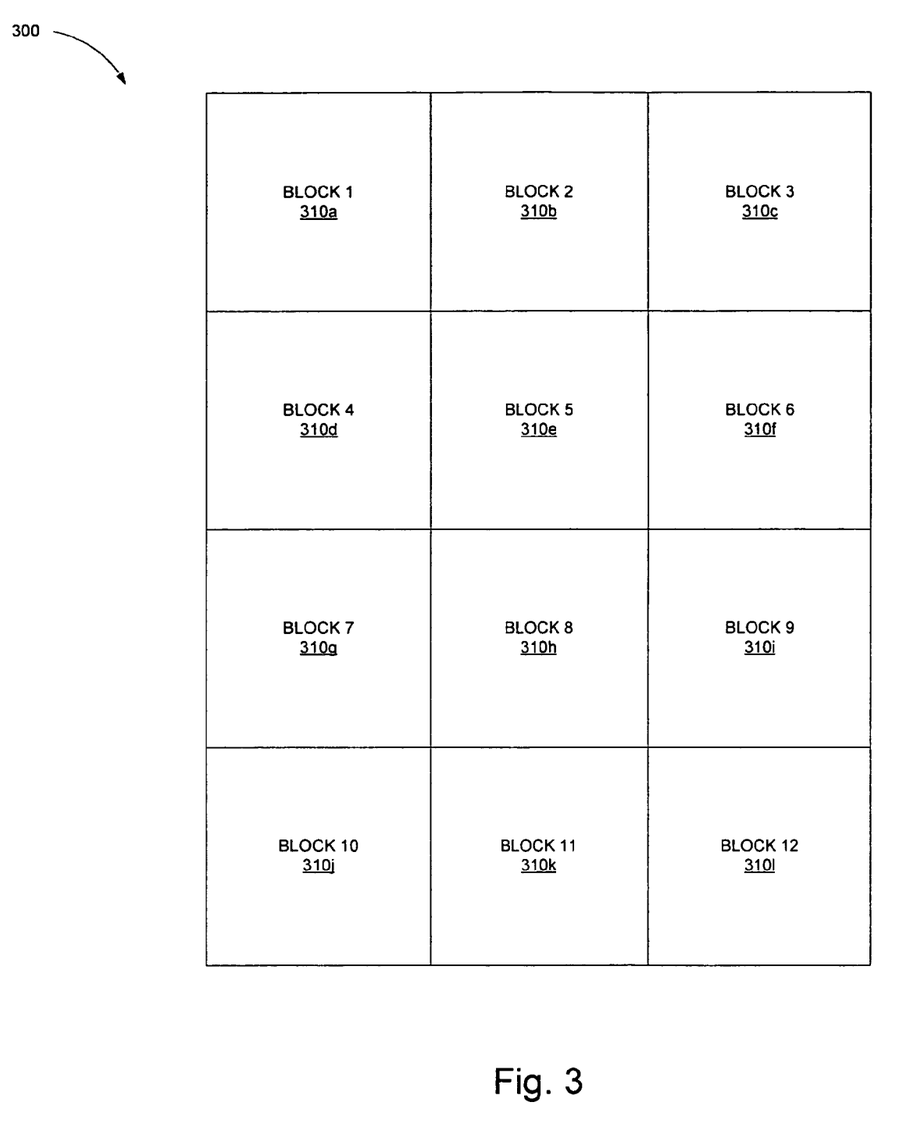
FIG. 3 is an illustration of a frame divided into a plurality of blocks that may be used with the techniques described herein.

In accordance with aspects of the techniques described herein, frames contained in a video are analyzed to determine if the frame may be selected as a poster frame. Illustratively, this analysis involves dividing a frame into a series of blocks and analyzing pixels contained in the blocks to determine which blocks are considered "good" and which are considered "bad." A block is illustratively considered to be good if a luminance value for at least one pixel contained in the block is outside a predetermined range of luminance values; otherwise, the block is considered bad. A frame containing a predetermined number of good blocks may then be selected as the poster frame for the video. FIG. 3 illustrates one way a frame 300 may be divided into blocks 310 in accordance with the techniques described herein.

Referring to FIG. 3, frame 300 is illustratively a 300 pixel by 400 pixel frame that is divided into a series of twelve blocks 310. Each block 310 is a 100 pixel by 100 pixel portion of the frame 300. Dividing a frame into blocks and analyzing the blocks to determine if the frame may be selected as the poster frame acts to obviate localization errors that may be present in the frame and may otherwise cause a poor frame to be selected as a poster frame. For example, assume a frame 300 is almost completely purple except for a few white pixels clustered in the area denoted as "block 1" 310a. Ordinarily, this frame may not be considered a good candidate for the poster frame as it is almost entirely monochrome. Dividing the frame into blocks and analyzing the blocks in accordance with the techniques described herein enables this conclusion to be drawn because most of the blocks contained in the frame would be determined to be bad.

Figure 4A:
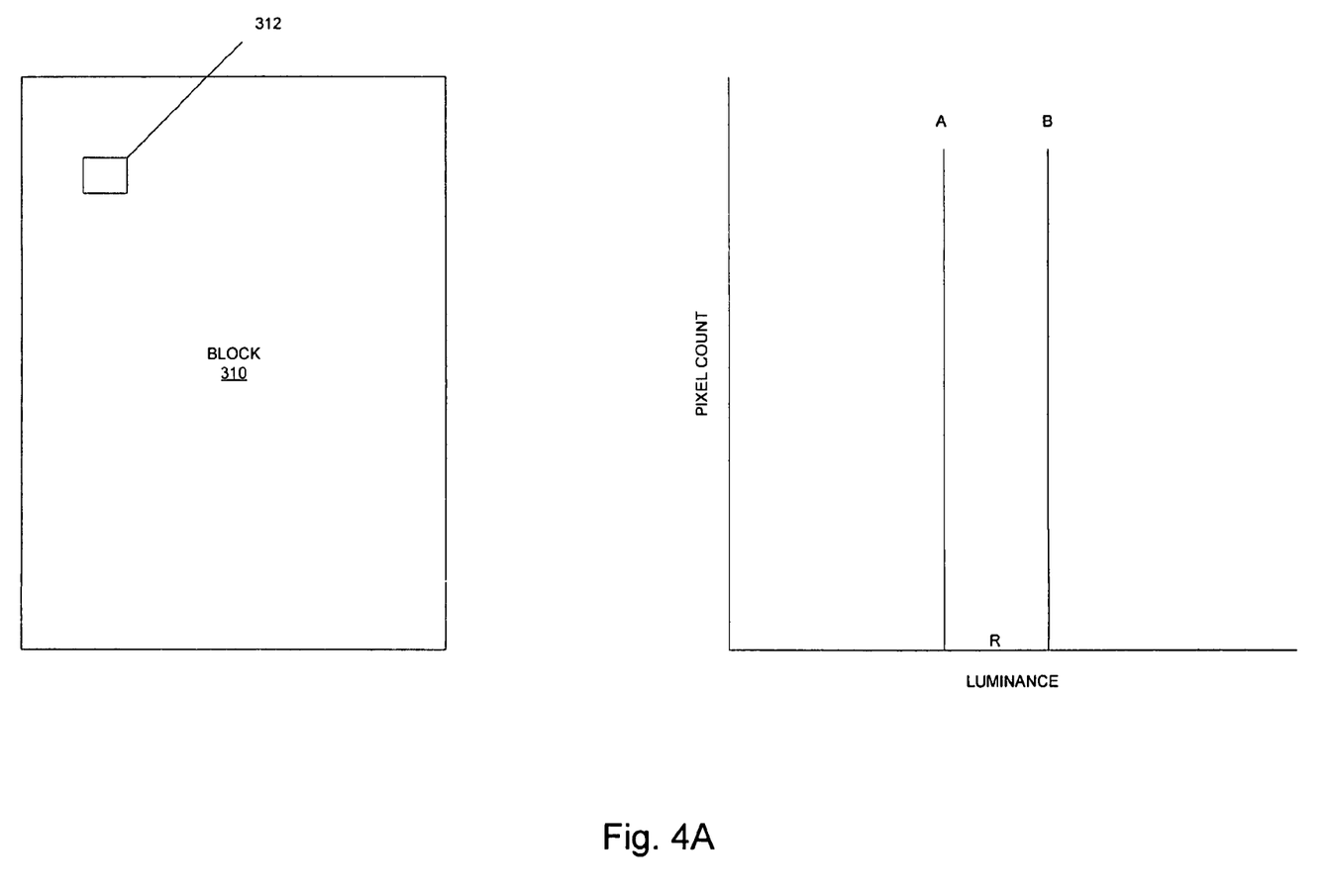
FIGS. 4A-C illustrate an example of an analysis of a block contained in a frame in accordance with the techniques described herein.
Figure 4B:
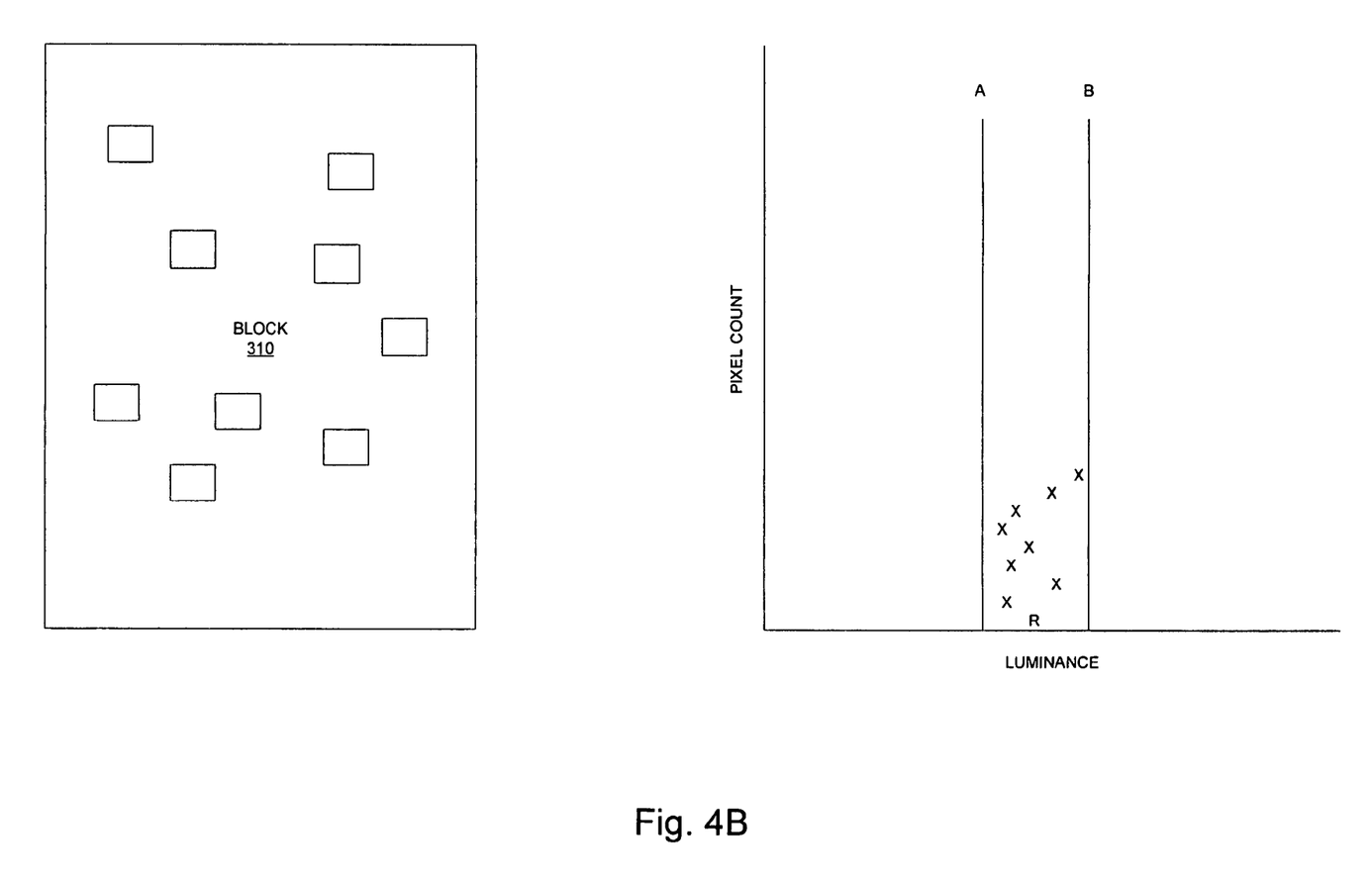
Figure 4C:
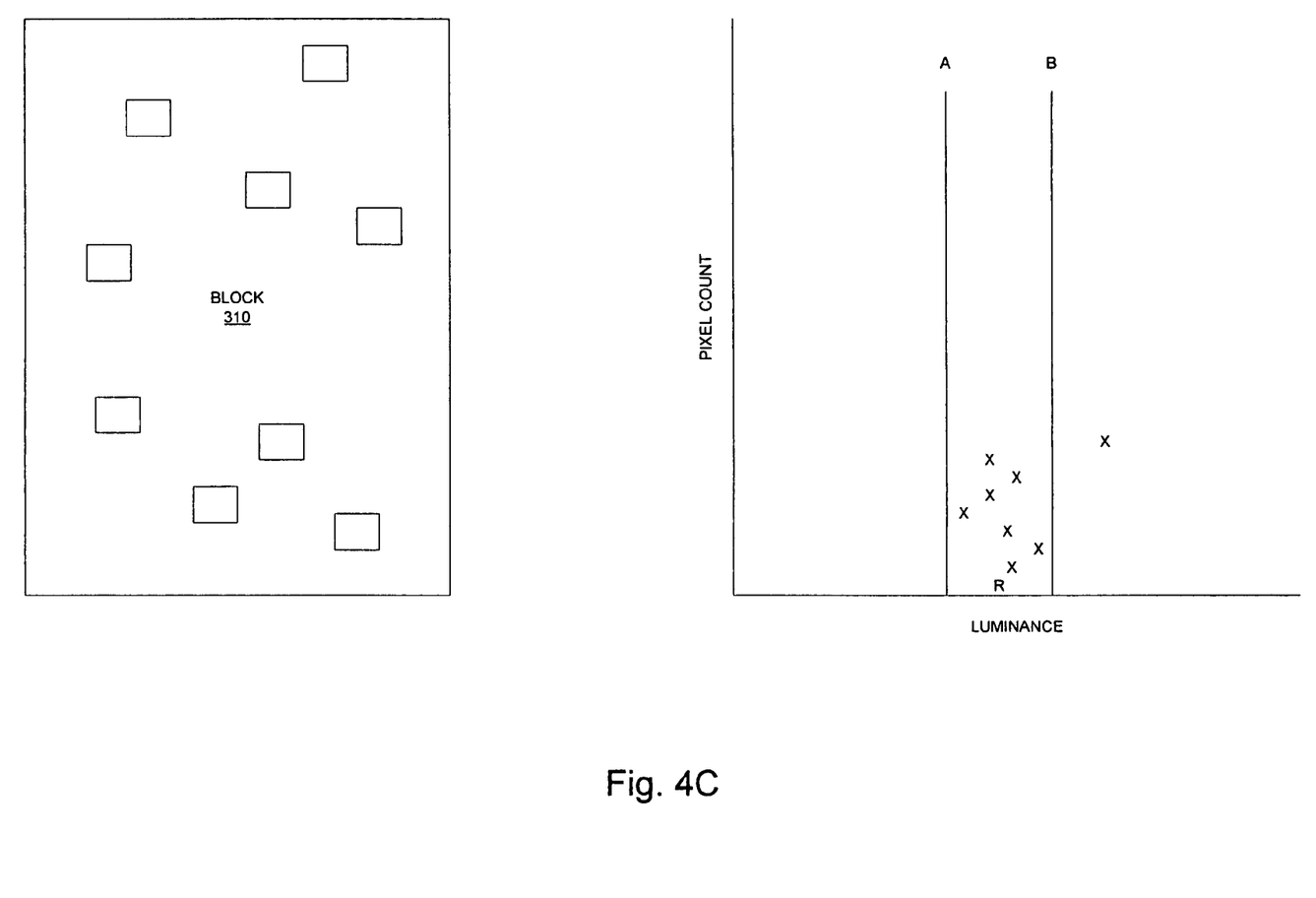

As noted above, pixels within a block 310 are analyzed to determine if the block 310 is good or bad. FIGS. 4A-C illustrate a technique that may be used to determine if a block is good or bad. Referring to FIG. 4A, an initial (reference) pixel 312 is selected, illustratively, at random within the block 310. A luminance value is then generated for the reference pixel. This luminance value is shown in the graph to the right of the block 310 as "R". A luminance value for a pixel may be generated using the following formula:

$$L = 0.299R + 0.587G + 0.114B$$

Where:
 L is the luminance value for the pixel;
 R is an intensity of the color red in the pixel;
 G is an intensity of the color green in the pixel; and
 B is an intensity of the color blue in the pixel.

A range of luminance values is then derived from the reference pixel's luminance value. The low end of the range and the high end of the range are denoted in the graph as "A" and "B", respectively. The low end and high end of the range may be derived from the luminance value associated with the reference pixel using the following formulas:

$$A = L_R - N \text{ and } B = L_R + N$$

Where:

A is the low end of the range;

B is the high end of the range;

$L_R$ is the luminance of the reference pixel; and

N is a constant.

Thus, for example, assume the R, G and B values for reference pixel 312 are 121, 123 and 115, respectively. Using the formula described above yields a luminance value of 121.49 for the pixel 312. Assuming N is 10 and using the above-described formulas, the range of luminance values would then be 111.49 at the low end of the range and 131.49 at the high end of the range.

FIG. 4B illustrates an example of an analysis of a block 310 in accordance with the techniques described herein that results in concluding the block 310 is bad. Here, a reference pixel is selected at random, its luminance value is generated and a range of luminance values is then generated from the reference pixel's luminance value, as described above. The luminance value for the reference pixel is denoted in the graph to the right of the block 310 as "R" and the low end and high end of the range of values are denoted in the graph as "A" and "B", respectively. In addition, eight additional pixels are illustratively selected at random and their luminance values are generated using the above-described formula. These values are denoted in the graph as "X". Note that all of the luminance values fall within the range of luminance values bounded by the low end and high end values "A" and "B", respectively. In accordance with the techniques described herein, since none of the luminance values associated with the additional pixels are outside this range, the block 310 is considered bad.

In the above example, the reference pixel and the additional eight pixels are selected at random. It should be noted that other techniques for selecting the reference pixel and the additional pixels may be used with the techniques described herein. Moreover, other numbers of pixels may be used with the techniques described herein.

FIG. 4C illustrates an example of an analysis of a block 310 in accordance with the techniques described herein that results in concluding the block 310 is a good. Here, as above, a reference pixel is illustratively selected at random, its luminance value is generated and a range of luminance values is then generated from the reference pixel's luminance value. The luminance value for the reference pixel is denoted in the graph to right of the block 310 as "R" and the low end and high end of the range of values are denoted in the graph as "A" and "B", respectively. In addition, eight additional pixels are illustratively selected at random and their luminance values are generated using the above-described formula. These values are denoted in the graph as "X". Note that one luminance value associated with an additional pixel falls outside the range of luminance values and the remaining luminance values fall within the range of values. In accordance with the techniques described herein, at least one luminance value associated with the additional pixels contained in a block must be outside the range of luminance values in order for the block to be considered good. Since this is the case for block 310 illustrated in FIG. 4C, the block 310 is considered to be good.

Figure 5:
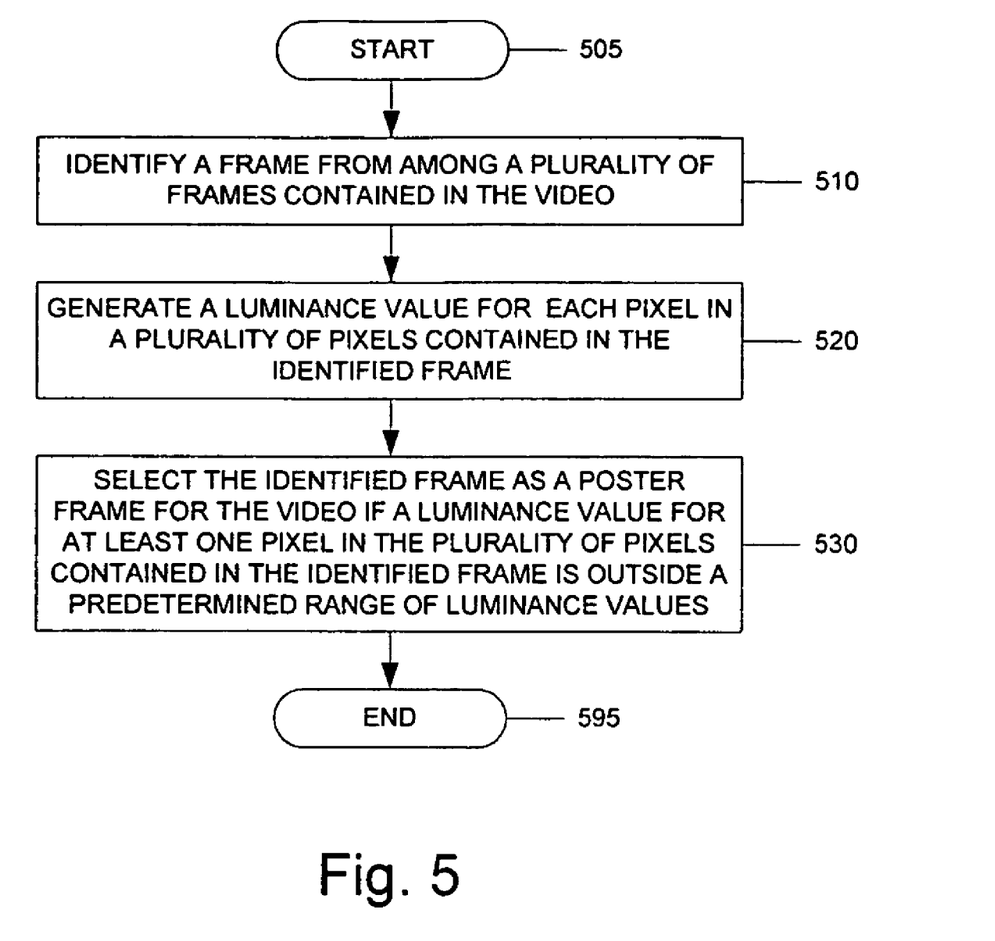
FIG. 5 is a flow chart of a sequence of steps that may be used to select a poster frame for a video in accordance with an aspect of the techniques described herein.

FIG. 5 is a flowchart of a sequence of steps that may be used to select a frame contained in a video as a poster frame for the video in accordance with an aspect of the techniques described herein. The sequence begins at step 505 and proceeds to step 510 where a frame is identified from among a plurality of frames contained in the video. Next, at step 520, a luminance value for each pixel in a plurality of pixels contained in the frame is generated. The pixels may include a number of randomly chosen pixels contained in the frame. At step 530, the frame is selected as a poster frame for the video if a luminance value for at least one of the pixels in the plurality of pixels contained in the identified frame is outside a predetermined range of luminance values. Note that the predetermined range of luminance values may be determined using a reference pixel, as described above. Alternatively, the predetermined range of luminance values may be hard coded or specified, e.g., by a user. The sequence ends at step 595.

For example, referring to FIGS. 1 and 5, assume video data 136 is a video clip containing sixty seconds of video wherein each second of video contains twenty-five frames and each frame contains 12,000 pixels. In accordance with the techniques described herein, a poster frame for the video may be selected as follows. A frame contained within the video is identified for analysis (step 510). Assume the identified frame is a randomly chosen frame contained in the first second of the video. Next, luminance values are generated for a plurality of pixels contained in the identified frame (step 520). Assume that the plurality of pixels comprises ten pixels which are selected at random among the 12,000 pixels contained in the identified frame. Thus, ten luminance values (one for each of the 10 pixels) is generated, as described above.

The luminance values are then compared with a predetermined range of luminance values to determine if any pixel's luminance value is outside the range of luminance values. If a pixel's luminance value is outside the range of luminance values, the frame is selected as a poster frame for the video (step 540). Note that in addition to the 10 pixels, a reference pixel contained in the frame may be used to generate the predetermined range of luminance values. If none of the luminance values are outside the range, the frame is illustratively not considered a good candidate for the poster frame and additional frames in the video 136 may be selected (e.g., at random) and analyzed as described above.

Figure 6:
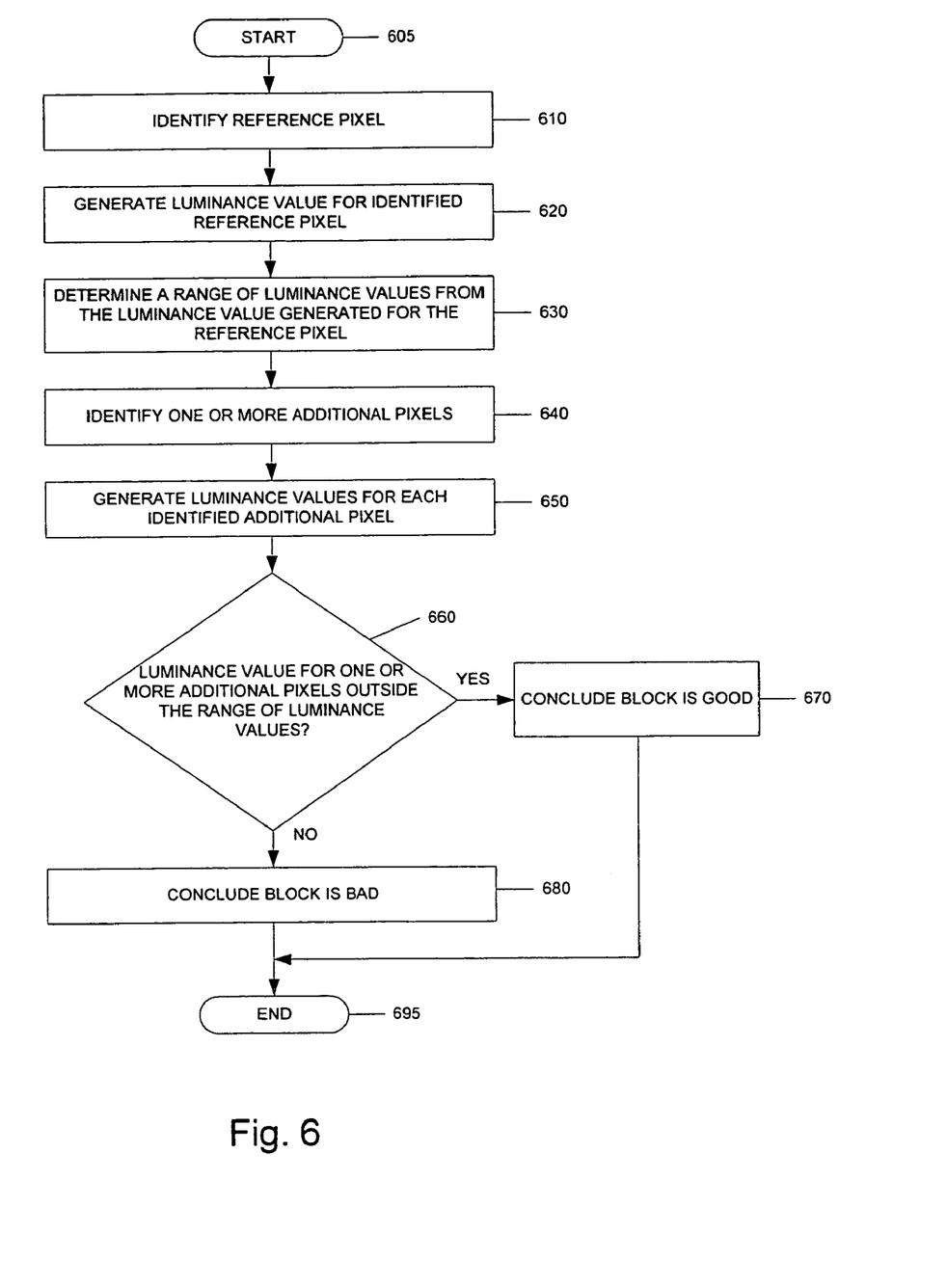
FIG. 6 is a flow chart of a sequence of steps that may be used to analyze a block contained within a frame in accordance with the techniques described herein.

As noted above, a frame may divided into a series of blocks and each block may be analyzed to determine if the block is good or bad. FIG. 6 is a flow chart of a sequence of steps that may be used to determine if a block contained in a frame is good or bad in accordance with aspects of the techniques described herein. Referring to FIG. 6, the sequence begins at step 605 and proceeds to step 610 where a pixel contained in the block is identified as a reference pixel for that block. The reference pixel may selected at random from the pixels contained in the block. Next, at step 620, a luminance value is generated for the reference pixel. At step 630, a range of luminance values is then determined from the reference pixel's luminance value.

At step 640, one or more additional pixels (i.e., pixels other than the reference pixel), are then identified from the pixels contained in the frame. Next, at step 650, a luminance value is generated for each identified additional pixel. A check is then performed, at step 660, to determine if the luminance values for any of the additional pixels falls outside the range of luminance values. Illustratively, if a luminance value associated with a pixel is greater than the high end of the range of luminance values or is less than the low range of luminance values, the luminance value for the pixel is considered to be outside the range of luminance values.

If at step 660 one or more of the luminance values are determined to be outside the range of luminance values, the sequence proceeds to step 670 where the block is considered (concluded) to be good. Otherwise, the sequence proceeds to step 680 where the block is considered (concluded) to be bad. The sequence ends at step 695.

Figure 7A:
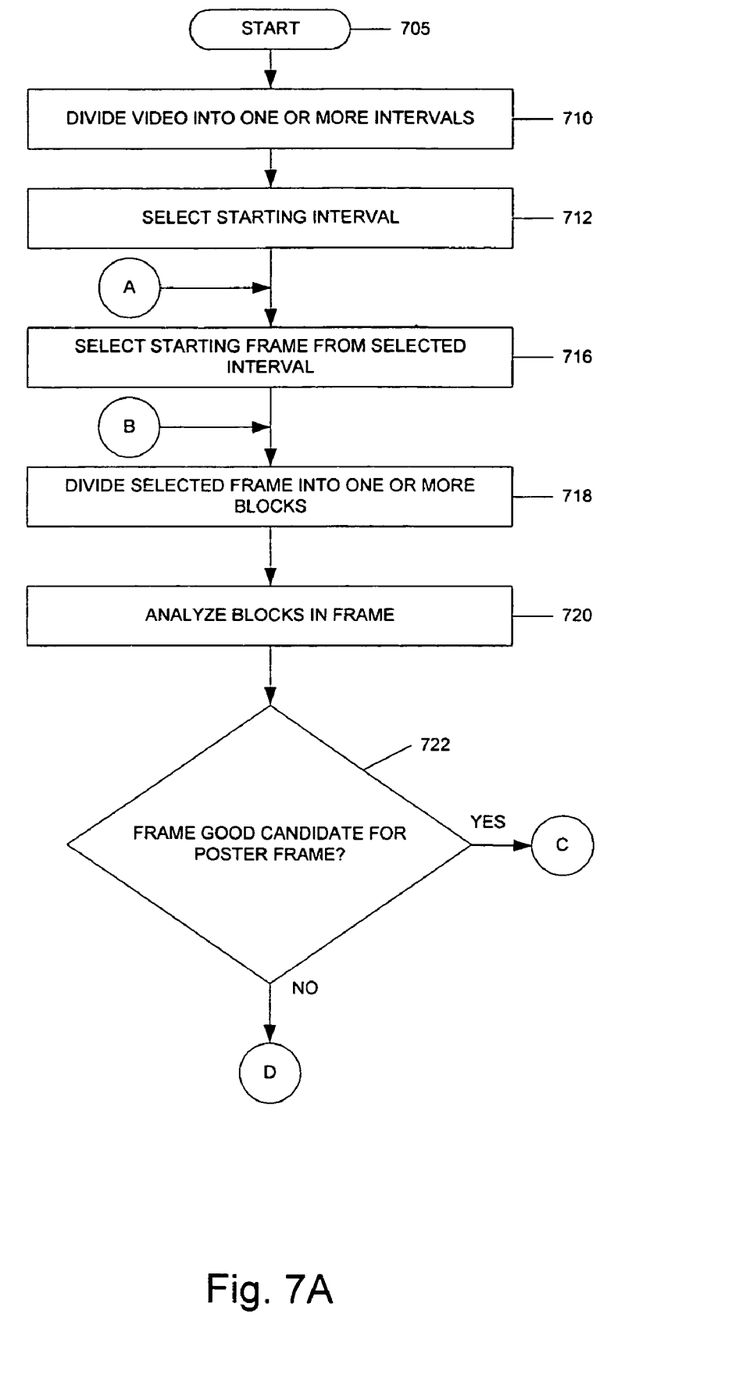
FIGS. 7A-C are a flow chart of a sequence of steps that may be used to select a poster frame for a video in accordance with an aspect of the techniques described herein that includes dividing frames into blocks and analyzing the blocks to determine if the frame should be selected as a poster frame for the video.
Figure 7B:
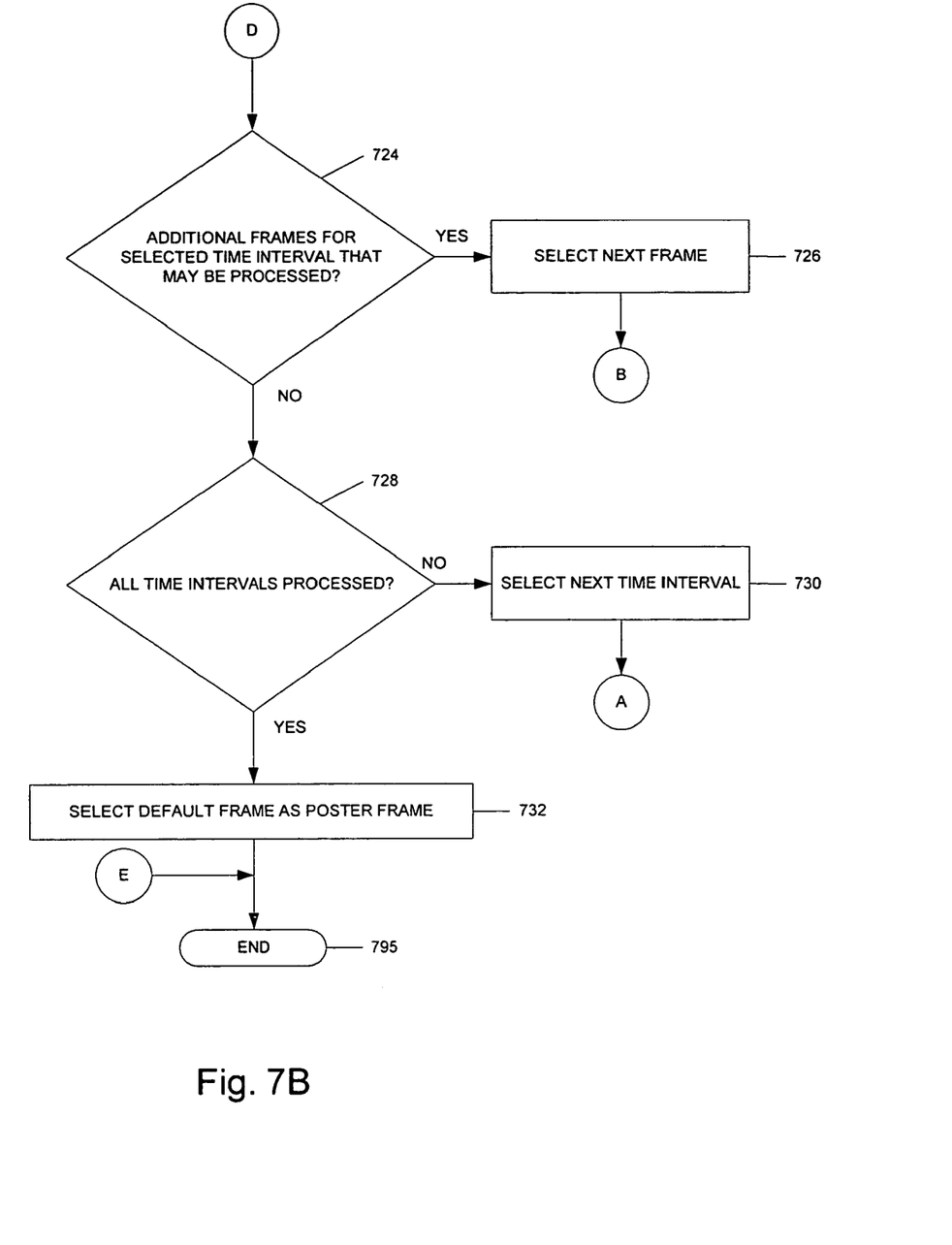
Figure 7C:
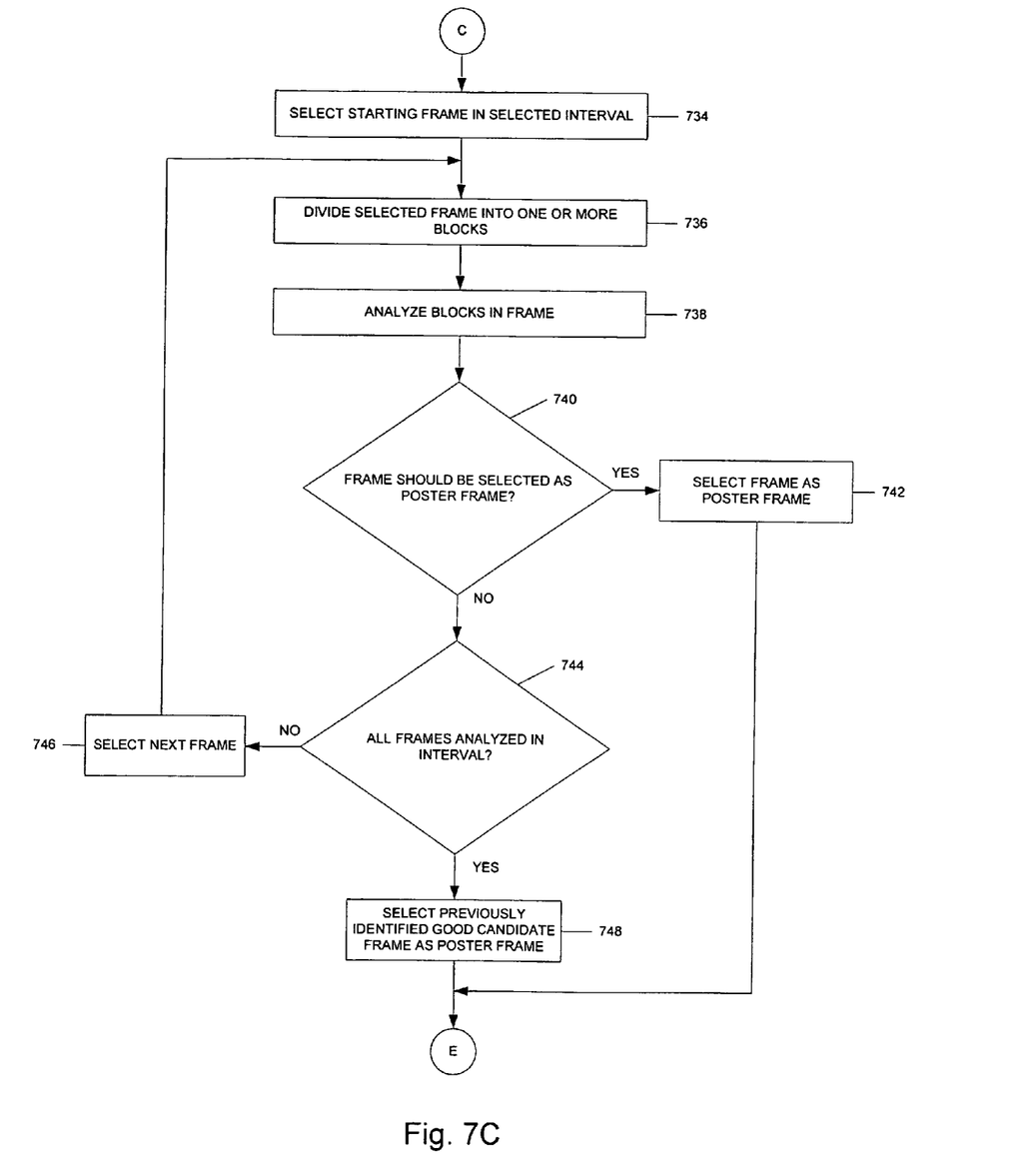

As noted above, a frame contained in a video may be divided into a series of blocks and the blocks may be analyzed to determine if the frame is a good candidate for a poster frame for the video. FIGS. 7A-C are a flow chart of a sequence of steps that may be used to select a poster frame for a video in accordance with an aspect of the techniques described herein that includes dividing frames into blocks and analyzing the blocks to determine if the frame should be selected as a poster frame for the video. Referring to FIG. 7A, the sequence begins at step 705 and proceeds to step 710 where the video is divided into one or more time intervals wherein each interval contains a plurality of frames of the video. Next, at step 712, a starting time interval in the one or more time intervals is selected. Illustratively, the selected starting time interval is the first time interval starting at the beginning of the video. Alternatively, the starting time interval may be randomly selected from among the time intervals in the video.

At step 716, a frame contained in the selected time interval is selected as a starting frame. Illustratively, the starting frame is selected at random within the selected time interval. The selected frame, at step 718, is then divided into one or more blocks, such as described above. Next, at step 720 one or more blocks within the frame are analyzed to identify, e.g., a number of good blocks and a number bad blocks in the frame. Illustratively, all of the blocks in the frame are analyzed. Alternatively, some but not all of the blocks contained in the frame may be analyzed. Moreover, the blocks may be randomly chosen.

At step 722, a check is performed to determine if the frame is a good candidate for being a poster frame for the video. Illustratively, a frame is considered a good candidate for being the poster frame for the video if a percentage (e.g., 70%) of the analyzed blocks are determine to be good. Alternatively, a frame may be considered a good candidate for the poster frame if, e.g., the number of good blocks found in the frame exceed a predetermined amount or a ratio of good blocks to bad blocks in the frame exceeds a predetermined ratio. If the frame is a good candidate for being a poster frame, the sequence proceeds to step 734 (FIG. 7C). Otherwise, the sequence proceeds to step 724 (FIG. 7B).

At step 724, a check is performed to determine if there are additional frames in the selected time interval that may be processed, as described above (e.g., the time intervals contain frames that had not been previously processed). If additional frames are available for processing, the sequence proceeds to step 726 where a next frame is selected from the available frames. The sequence then returns to step 718 (FIG. 7A) to process the selected frame. Illustratively, the next frame is randomly selected from among the available frames contained in the selected time interval.

If at step 724, no additional frames are available for processing, the sequence proceeds to step 728 where a check is performed to determine if all of the time intervals in the video have been processed. If not, the sequence proceeds to step 730 where a next time interval is selected. Illustratively, the time interval that is selected is the next chronologically occurring time interval in the video. Alternatively, the time interval may be randomly selected from time intervals contained in the video that have not already been processed. After the next time interval has been selected, the sequence returns to step 716.

If at step 728 all of the time intervals have been processed, the sequence proceeds to step 732 where a default frame is selected from the video. This default frame may be, for example, the first frame contained in the video, some other frame contained in the video or some user defined frame. The sequence then proceeds to step 795 where the sequence ends.

Returning to step 722 (FIG. 7A), as noted above if the frame is considered to be a good candidate for the poster frame, the sequence proceeds to step 734 (FIG. 7C) where a starting frame in the selected time interval is selected. Illustratively, the selected starting frame is the first frame in the selected time interval. Next, at step 736, the selected frame is divided into one or more blocks and at step 738, the blocks are then analyzed to determine if they are good or bad, illustratively as described above.

At step 740, a check is performed to determine if the frame should be selected as a poster frame for the video based on the number of blocks determined (concluded) to be good in the frame. Illustratively, a frame may be selected as the poster frame for the video if a percentage (e.g., 70%) of the analyzed blocks are determine to be good. Alternatively, a frame may selected as a poster frame if, e.g., a predetermined number of blocks found in the frame are found to be good or a ratio of good blocks to bad blocks in the frame exceeds a predetermined ratio.

If at step 740 it is determined the frame should be selected as the poster frame for the video, the sequence proceeds to step 742 where the frame is selected as the poster frame for the video. The sequence then proceeds to step 795. Otherwise, if at step 740, it is determined the frame should not be selected as the poster frame, the sequence proceeds to step 744 where a check is performed to determine if all of the frames contained in the selected time interval have been analyzed. If not, the sequence proceeds to step 746 where a next frame in the time interval is selected. The sequence then returns to step 736. Illustratively, the next frame in the time interval that is selected is the next chronological frame in the time interval. Alternatively, the next frame may be, e.g., some other frame in the time interval that has not yet been analyzed.

If at step 744 all of the frames for the interval have been analyzed, the sequence proceeds to step 748 where the frame that was previously identified as a good candidate for a poster frame at step 722 (FIG. 7A) is selected as a poster frame for the video. The sequence then proceeds to step 795.

For example, suppose a user at system 100 (FIG. 1) wishes to use the system 100 to automatically select a poster frame for a video contained in video data 136. Further, assume the video is sixty seconds in length, each second of the video contains twenty-five frames 300 and each frame 300 contains 12,000 pixels. Referring to FIGS. 1, 6 and 7A-C, system 100 divides the video into one or more time intervals (step 710). Assume the video is divided into sixty one-second time intervals where each time interval contains twenty-five frames. Next, the system 100 selects a starting time interval in the video (step 712). Assume the starting interval in the video that is selected is the first time interval in the video.

System 100 then selects a starting frame 300 contained in the starting time interval (step 716). Assume that the starting frame is randomly selected from the starting time interval. Next, system 100 divides the frame 300 into a series of blocks 310 (step 718). Assume the frame 300 is divided into twelve blocks 310, as described above.

System 100 then analyzes selected blocks 310 within the frame 300, as described above (step 720).

Specifically, referring to FIG. 6, for each selected block 310, system 100 identifies a reference pixel contained in the block 310 (step 610) and generates a luminance value for the identified reference pixel (step 620), as described above. Using the reference pixel's luminance value, system 100 then derives values for a high end of a range and a low end of the range, as described above (step 630). System 100 then identifies one or more additional pixels contained in the block 310 (step 640) and generates luminance values for these identified pixels (step 650). Next, system 100 determines if any of the luminance values generated for the additional pixels are outside the identified range of luminance values (step 660). For example, system 100 may compare each luminance value with the low end and high end range values, as described above, to determine if the luminance value is outside the range of luminance values. If the luminance value of at least one pixel falls outside the identified range of luminance values, system 100 considers the block 300 to be good (step 670). Otherwise, if none of the luminance values are outside the identified range of luminance values, the system 100 considers the block 300 to be bad (step 680).

After selected blocks 310 in the frame 300 have been analyzed, system 100 determines if the frame is a good candidate for a poster frame (step 722), as described above. Assume the frame 300 is a good candidate for the poster frame. System 100 then selects a starting frame 300 in the selected time interval (step 734). Assume, the system 100 selects the first frame 300 contained in the selected time interval as the starting frame 300.

System 100 divides the selected frame 300 into one or more blocks 310, as described above (step 736). System 100 then analyzes the blocks 310 (step 738) and determines if the frame 300 should be selected as a poster frame for the video (step 740), as described above. Assume system 100 determines that the frame should be selected as the poster frame for the video. System 100 then selects the frame as the poster frame for the video (step 742).

While techniques described herein have been particularly shown and described with references to particular embodiments, it will be understood by those skilled in the art that various changes in form and details may be made therein without departing from the scope and spirit of the invention encompassed by the appended claims. As such, the foregoing described embodiments are not intended to be limiting. Rather, any limitations to embodiments of the invention are presented in the following claims.

What is claimed is:

1. A method in a computerized device, the method comprising:
   identifying a frame in a plurality of frames contained in a video;
   generating a luminance value for each pixel in a plurality of pixels contained in the identified frame; and
   selecting the identified frame as a poster frame for the video if a luminance value for at least one pixel in the plurality of pixels contained in the identified frame is outside a predetermined range of luminance values, wherein the step of generating a luminance value for each pixel further comprises:
   dividing the identified frame into a plurality of blocks; and
   for each block in the plurality of blocks:
      (a) generating a luminance value for a reference pixel contained in the block, and
      (b) generating a luminance value for one or more additional pixels contained in the block;
   wherein the step of selecting the identified frame further comprises:
   determining the range of luminance values from the generated luminance value for the reference pixel;
   for each block in the plurality of blocks:
      (a) comparing the generated luminance values for the one or more additional pixels with the range of luminance values, and
      (b) concluding the block is good if one or more luminance values for the one or more additional pixels are outside the range of the luminance values; and
   selecting the identified frame as the poster frame for the video based on a number of blocks concluded to be good.

2. A method as defined in claim 1 wherein the range of luminance values is determined from a luminance value associated with a reference pixel contained in the frame.

3. A method as defined in claim 1 wherein the step of identifying a frame among a plurality of frames in a video further comprises:
   dividing the video into a plurality of time intervals, each time interval containing one or more frames of the video;
   identifying a time interval in the plurality of time intervals; and
   identifying the frame from the one or more frames contained in the identified time interval.

4. A method as defined in claim 1 further comprising:
   generating a luminance value for a reference pixel in the plurality of pixels; and
   determining the range of luminance values from the generated luminance value for the reference pixel.

5. A method as defined in claim 1 wherein the step of selecting further comprises:
   comparing the generated luminance values with the range of luminance values; and
   selecting the identified frame as the poster frame for the video if the result of the comparison indicates that one or more luminance values are outside the range of luminance values.

6. The method as in claim 1, comprising:
   wherein generating a luminance value for each pixel in a plurality of pixels contained in the identified frame includes:
      identifying at least one reference pixel from the plurality of pixels; and
      for each pixel in the plurality of pixels, identifying a color intensity occurring in each pixel, the color intensity represented via the luminance value of the respective pixel, wherein the color intensity relates to at least one color in the respective pixel; and
   wherein selecting the identified frame as a poster frame for the video includes:
      selecting the identified frame as the poster frame upon detecting a number of pixels in the plurality of pixels each have a respective color intensity occurring outside a range, wherein a color intensity occurring in the reference pixel falls between an upper boundary of the range and a lower boundary of the range, wherein the poster frame comprises multi-colored content, occurring in the video, selected to visually represent the overall content of the video.

7. The method as in claim 6, wherein selecting the identified frame as the poster frame for the video includes:
   creating the poster frame as a selectable thumbnail which, upon selection, initiates playback of the video.

8. The method as in claim 1, comprising:
   wherein generating a luminance value for each pixel in a plurality of pixels contained in the identified frame includes:

identifying at least one reference pixel from the plurality of pixels; and for each pixel in the plurality of pixels, identifying an extent of a brightness of at least one color occurring in each respective pixel, the extent of the brightness of the at least one color represented via the luminance value of the respective pixel; and wherein selecting the identified frame as a poster frame for the video includes:

selecting the identified frame as the poster frame upon detecting a number of pixels in the plurality of pixels each have a respective extent of brightness of the at least one color occurring outside a range, wherein an extent of brightness of at least one color occurring in the reference pixel falls between an upper boundary of the range and a lower boundary of the range, wherein the poster frame comprises multi-colored content, occurring in the video, selected to visually represent the overall content of the video.

9. An apparatus comprising:

a data storage configured to hold a plurality of frames contained in a video; and a processor configured to:
(a) identify a frame in a plurality of frames contained in a video,
(b) generate a luminance value for each pixel in a plurality of pixels contained in the identified frame, and
(c) select the identified frame as a poster frame for the video if a luminance value for at least one pixel in the plurality of pixels contained in the identified frame is outside a predetermined range of luminance values, wherein the processor is further configured to:
(a) divide the frame into a plurality of blocks, and
(b) for each block in the plurality of blocks:
(1) generate a luminance value for a reference pixel contained in the block, and
(2) generate a luminance value for one or more additional pixels contained in the block, wherein the processor is further configured to:
(a) determine the range of luminance values from the generated luminance value for the reference pixel,
(b) for each block in the plurality of blocks:
(1) compare the generated luminance values for the one or more additional pixels with the range of luminance values,
(2) conclude the block is good if a predetermined number of luminance values for the one or more additional pixels are outside the range of the luminance values, and
(c) select the identified frame as the poster frame for the video based on a number of blocks concluded to be good.

10. An apparatus as defined in claim 9 wherein the range of luminance values is determined from a luminance value associated with a reference pixel contained in the frame.

11. An apparatus as defined in claim 9 wherein the processor is further configured to:
(a) divide the video into a plurality of time intervals, each time interval containing one or more frames of the video,
(b) identify a time interval in the plurality of time intervals, and
(c) identify the frame from the one or more frames contained in the identified time interval.

12. An apparatus as defined in claim 9 wherein the processor is further configured to:
(a) generate a luminance value for a reference pixel in the plurality of pixels, and (b) determine the range of luminance values from the generated luminance value for the reference pixel.

13. An apparatus as defined in claim 9 wherein the processor is further configured to:
(a) compare the generated luminance values with the range of luminance values, and
(b) select the identified frame as the poster frame for the video if the result of the comparison indicates that one or more luminance values are outside the range of luminance values.

14. A non-transitory computer-readable medium comprising computer-executable instructions for:

identifying a frame in a plurality of frames contained in a video;

generating a luminance value for each pixel in a plurality of pixels contained in the identified frame; and selecting the identified frame as a poster frame for the video if a luminance value for at least one pixel in the plurality of pixels contained in the identified frame is outside a predetermined range of luminance values;

wherein generating the luminance value for each pixel includes:

dividing the identified frame into a plurality of blocks;

for each block in the plurality of blocks:
(a) generating a luminance value for a reference pixel contained in the block, and
(b) generating a luminance value for one or more additional pixels contained in the block;

wherein selecting the identified frame further comprises:

determining the range of luminance values from the generated luminance value for the reference pixel;

for each block in the plurality of blocks:
(a) comparing the generated luminance values for the one or more additional pixels with the range of luminance values, and
(b) concluding the block is good if one or more luminance values for the one or more additional pixels are outside the range of the luminance values; and selecting the identified frame as the poster frame for the video based on a number of blocks concluded to be good.

15. A non-transitory computer-readable medium as defined in claim 14 wherein the range of luminance values is determined from a luminance value associated with a reference pixel contained in the frame.

16. A non-transitory computer-readable medium as defined in claim 14 further comprising computer-executable instructions for:

dividing the video into a plurality of time intervals, each time interval containing one or more frames of the video;

identifying a time interval in the plurality of time intervals; and identifying the frame from the one or more frames contained in the identified time interval.

17. A non-transitory computer-readable medium as defined in claim 14 further comprising computer-executable instructions for:

generating a luminance value for a reference pixel in the plurality of reference pixels; and determining the range of luminance values from the generated luminance value for the reference pixel.

18. A non-transitory computer-readable medium as defined in claim 14 further comprising computer-executable instructions for:

comparing the generated luminance values with the range of luminance values; and selecting the identified frame as the poster frame for the video if the result of the comparison indicates that one or more luminance values are outside the range of luminance values.

19. A method in a computerized device, the method comprising:
(a) dividing a video into one or more time intervals, each time interval containing one or more frames;
(b) selecting a time interval from the one or more time intervals;
(c) identifying a frame in the time interval;
(d) dividing the identified frame into a plurality of blocks, each block containing a plurality of pixels contained in the frame;
(e) for one or more blocks in the plurality of blocks:
(1) identifying a reference pixel from the plurality of pixels contained in the block,
(2) generating a luminance value for the identified reference pixel,
(3) determining a range of luminance values from the generated luminance value for the identified reference pixel,
(4) generating luminance values for one or more additional pixels contained in the block,
(5) determining if any of the luminance values for the additional pixels are outside of the range of luminance values, and
(6) concluding the block is a good if any of the luminance values for the additional pixels are outside the range of luminance values; and
(f) selecting the frame as a poster frame for the video based on a number of blocks concluded to be good.

20. A method in a computerized device, the method comprising:
identifying a frame in a plurality of frames contained in a video;
generating a luminance value for each pixel in a plurality of pixels contained in the identified frame; and
selecting the identified frame as a poster frame for the video if a luminance value for at least one pixel in the plurality of pixels contained in the identified frame is outside a predetermined range of luminance values, wherein generating a luminance value for each pixel in a plurality of pixels contained in the identified frame includes:
identifying a plurality of frame portions within the identified frame; and
for each frame portion in the plurality of frame portions:
(i) selecting at least one pixel, from a group of pixels, as a reference, the group of pixels located in the respective frame portion;
(ii) identifying a color intensity occurring in each pixel in the group of pixels, the color intensity represented via the luminance value of the respective pixel, wherein the color intensity relates to at least one color in the respective pixel;
(iii) identifying the respective frame portion as a bad frame portion unless at least one pixel in the group of pixels has a respective color intensity occurring outside a range, wherein a color intensity occurring in the reference falls between an upper boundary of the range and a lower boundary of the range; and
(iv) if at least one pixel in the group of pixels has the respective color intensity occurring outside the range, identifying the respective frame portion as a good frame portion.

21. The method as in claim 20, wherein selecting the identified frame as a poster frame for the video includes:
selecting the identified frame as the poster frame upon detecting the identified frame has at least a pre-determined number of good frame portions, wherein the poster frame comprises multi-colored content, occurring in the video, selected to visually represent the overall content of the video.

22. A method in a computerized device, the method comprising:
identifying a frame in a plurality of frames contained in a video;
generating a luminance value for each pixel in a plurality of pixels contained in the identified frame; and
selecting the identified frame as a poster frame for the video if a luminance value for at least one pixel in the plurality of pixels contained in the identified frame is outside a predetermined range of luminance values, wherein the range of luminance values is determined from a luminance value associated with a single reference pixel contained in the frame.

* * * * *